US006937270B1

(12) United States Patent
Dong et al.

(10) Patent No.: US 6,937,270 B1
(45) Date of Patent: Aug. 30, 2005

(54) ANALOG VIDEO MONITORING SYSTEM USING A PLURALITY OF PHASE LOCKED CMOS IMAGE SENSORS

(75) Inventors: Kimble Dong, Sunnyvale, CA (US); Xinping He, San Jose, CA (US); Hongli Yang, Sunnyvale, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 435 days.

(21) Appl. No.: 09/303,991

(22) Filed: May 3, 1999

(51) Int. Cl.[7] .............................. H04N 7/18; H04N 3/14; H04N 5/335; H04N 5/222

(52) U.S. Cl. ........................ 348/159; 348/294; 348/302; 348/333.01

(58) Field of Search .......................... 250/208.1; 348/47, 348/139, 143, 145, 159, 201, 207.99, 262, 294, 302, 333.01, 584, 588, 333.05, 218.1, 211.3, 333.07, 48, 49, 50

(56) References Cited

U.S. PATENT DOCUMENTS

| | | | | |
|---|---|---|---|---|
| 4,536,795 A | * | 8/1985 | Hirota et al. ................ | 348/714 |
| 4,931,872 A | * | 6/1990 | Stoddard et al. ............ | 348/588 |
| 5,144,445 A | * | 9/1992 | Higashitsutsumi .......... | 348/294 |
| 5,159,455 A | * | 10/1992 | Cox et al. ................. | 348/218.1 |
| 5,345,266 A | | 9/1994 | Denyer | |
| 5,499,146 A | * | 3/1996 | Donahue et al. ............ | 386/117 |
| 5,825,411 A | | 10/1998 | Cooper et al. | |
| 5,870,139 A | | 2/1999 | Cooper et al. | |
| 6,204,879 B1 | * | 3/2001 | Koseki et al. ............ | 348/230.1 |
| 6,289,139 B1 | * | 9/2001 | Chen et al. ................. | 382/312 |
| 6,317,166 B1 | * | 11/2001 | McCutchen ................ | 348/722 |
| 6,469,746 B1 | * | 10/2002 | Maida ........................ | 348/564 |
| 6,720,999 B1 | * | 4/2004 | Holberg et al. .......... | 348/222.1 |

FOREIGN PATENT DOCUMENTS

EP 0464606 1/1992

OTHER PUBLICATIONS

Cummins, T et al, "A PAL/NTSC Digital Video Encoder on 0.6–$\mu$m CMOS with 66 dB Typical SNR 0.4% Differential Gain, and 0.2 Differential Phase," IEEE Journal of Solid–State Circuits, Jul. 1, 1997, pp. 1091–1100, vol. 32, No. 7, IEEE Inc., New York, US.

Rodda, W.E. et al, "Full CMOS Video Line–Locked Phase–Pocked Loop System," IEEE Transactions on Comsumer Electronics, Aug. 1, 1993, pp. 496–502, vol. 39, No. 3, IEEE Inc., New York, US.

Ozaki, T et al, "A Low–Noise Line–Amplified MOS Imaging Devices," IEEE Transactions on Electron Devices, May 5, 1991, pp. 969–975, vol. 38, No. 5, IEEE Inc.; New York, US.

(Continued)

Primary Examiner—Wendy R. Garber
Assistant Examiner—Justin Misleh
(74) Attorney, Agent, or Firm—Perkins Coie LLP

(57) ABSTRACT

A CMOS camera image sensor that may be combined with additional CMOS camera image sensors to form a multiple-camera security monitoring system. Each CMOS image sensor includes phase-locked loop circuitry. The phase-locked loop circuitry receives a reference input signal and in response thereto synchronizes the video output of the CMOS image sensor to the reference input signal. In one configuration, one of the CMOS image sensors provides the reference signal, while in another configuration, the reference input signal may come from an external circuit. Each CMOS image sensor also includes state selection circuitry. The state selection circuitry allows the video output from the CMOS image sensor to be displayed on ¼, ½, or all of a display. Thus, the video signals from multiple CMOS image sensors may be displayed on a video monitor simultaneously.

7 Claims, 3 Drawing Sheets

OTHER PUBLICATIONS

Guan–Chyun Hsieh, *Industrial Electronics Handbook,* IEEE Press, 1997, Chap. 34, Phase–Locked Loop–Based Control, pp. 529–34.

H. Kawashima et al., "A ¼ inch format 250K pixel amplified MOS image sensor using CMOS process," *IEDM 93,* 1993, pp. 575–578.

T. Ozaki et al., "A low noise line–amplifier MOS imaging device,"*IEEE Transactions on Electron Devices,* vol. 28, No. 5, May 1991, pp. 969–975.

Smart Choice Quad Observation System, 11 pages, web page http://www.smart–choice.com, screen prints dated Mar. 18, 1999.

* cited by examiner

ANALOG VIDEO MONITORING SYSTEM USING A PLURALITY OF PHASE LOCKED CMOS IMAGE SENSORS

FIELD OF THE INVENTION

The present invention relates to CMOS image sensors and, more particularly, to a CMOS image sensor that can be used as part of a multiple-camera monitoring system.

BACKGROUND OF THE INVENTION

Integrated circuit technology has revolutionized various fields, including computers, control systems, telecommunications, and imaging. In the field of imaging, the charge coupled device (CCD) sensor has made it possible to manufacture relatively low-cost and small hand-held video cameras. Nevertheless, the solid-state CCD integrated circuits needed for imaging are relatively difficult to manufacture, and therefore are expensive. In addition, because of the different processes involved in the manufacture of CCD integrated circuits relative to MOS integrated circuits, the signal processing portion of the imaging sensor has typically been located on a separate integrated chip. Thus, a CCD imaging device includes at least two integrated circuits: one for the CCD sensor, and one for the signal processing logic.

An alternative low-cost technology to CCD integrated circuits is the metal oxide semiconductor (MOS) integrated circuit. Not only are imaging devices using MOS technology less expensive to manufacture relative to the CCD imaging device, but also for certain applications MOS devices are of superior performance. For example, the pixel elements in a MOS device can be made smaller and therefore provide a higher resolution than CCD image sensors. In addition, the signal processing circuitry can be integrated alongside the imaging circuitry, thus allowing for a single integrated chip to form a complete stand-alone imaging device.

Examples of MOS imaging devices are detailed in "A ¼ inch format 250 K pixel amplified MOS image sensor using CMOS process" by Kawashima et al., *IDEM*, 93–575 (1993), and in "A low noise line-amplifier MOS imaging device" by Ozaki et al., *IEEE Transactions on Electron Devices*, Vol. 38, No. 5, May 1991. In addition, U.S. Pat. No. 5,345,266 to Denyer, titled "Matrix Array Image Sensor Chip," describes a MOS image sensor. The devices disclosed in these publications provide a general design approach to MOS image devices.

Thus, MOS imaging devices can be used to form relatively low-cost video cameras. One common use for video cameras in general is in security monitoring systems, such as those used in homes or places of business. Such monitoring systems often use multiple cameras that are coupled to a single monitoring station from which an individual may observe all of the monitored areas. An example of such a prior art monitoring system is illustrated in FIG. 1.

As shown in FIG. 1, a monitoring system 10 includes four video cameras 11–14. Each of the video cameras 11–14 outputs a video signal to one of four video capture cards 21–24, respectively. Each of the video capture cards 21–24 outputs a video signal into one of four buffers 31–34, respectively. Each of the buffers 31–34 outputs a signal to a DSP video controller and multiplexer 40. The DSP video controller and multiplexer 40 outputs a digital signal to an encoder 50. The encoder 50 outputs an analog signal to a television (not shown) for display.

While the monitoring system 10 of FIG. 1 does provide for viewing from multiple cameras, it also requires that the video signals be converted from analog to digital for the signal processing, and then from digital to analog again for display on the television. This conversion from analog to digital, and then back again, requires extra processing circuitry and additional complexity for the system as a whole. In addition, because the system utilizes digital processing, the synchronization of the analog video signals is not addressed.

The present invention is directed to providing a MOS image sensor that can be used as part of a monitoring system that overcomes the foregoing and other disadvantages. More specifically, the present invention is directed to a MOS image sensor that can have its analog output signals displayed on various portions of a television monitor, as well as synchronizing its video signal with that from other MOS image sensors.

SUMMARY OF THE INVENTION

A CMOS image sensor for use in a multiple-camera monitoring system is disclosed. The imaging sensor is capable of processing image signals and providing them as a video signal for display on a display. Multiple image sensors are used to form the multiple-camera monitoring system.

In accordance with one aspect of the invention, the image sensor includes phase-locked loop circuitry. The phase-locked loop circuitry receives a reference input signal and in response thereto synchronizes the video output of the CMOS image sensor to the reference input signal. In one configuration, the reference input signal may be received from one of the CMOS image sensors that acts as a master device, while the remaining CMOS image sensors of the system act as the slave devices. In another configuration, the reference input signal may come from an external synchronization control circuit.

In accordance with another aspect of the invention, the CMOS image sensor includes state selection circuitry. The state selection circuitry receives a control signal and in response thereto causes the video output from the CMOS image sensor to be provided in one of several possible states. In a first state, the video output from the CMOS image sensor is intended to be displayed in only one of four quadrants of the display. In a second state, the video output from the CMOS image sensor is intended to be displayed on one-half of the display, and in a third state, the video output is intended to be displayed on the entire display. A master control circuit sends the control signals and coordinates the various image sensors that are to be displayed on the display.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
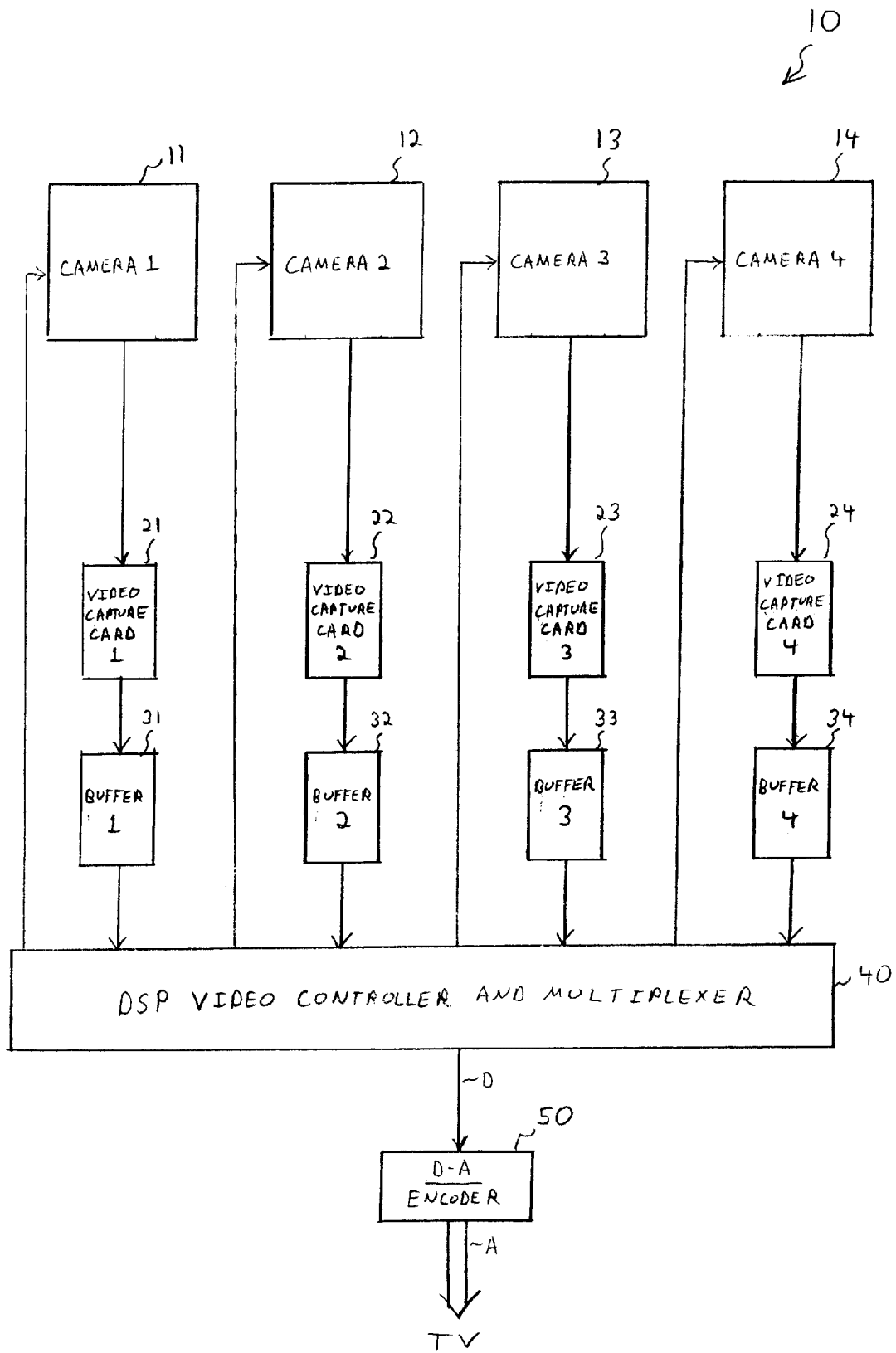
FIG. 1 is a block diagram of a prior art monitoring system.
Figure 2:
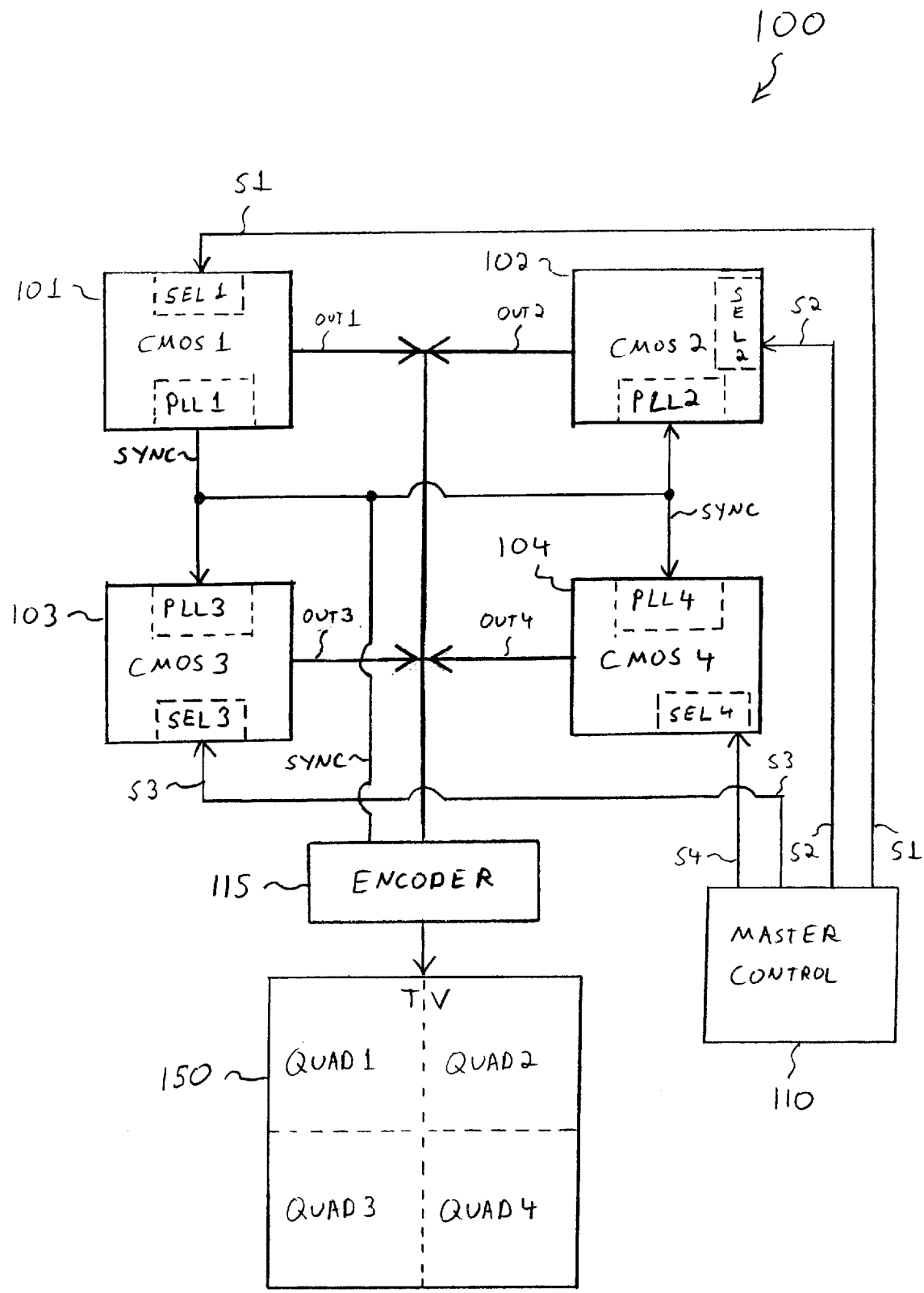
FIG. 2 is a block diagram of a monitoring system utilizing CMOS image sensors formed in accordance with the present invention.

With reference to FIG. 2, a monitoring system 100 utilizes four CMOS image sensors 101–104 formed in accordance with the present invention. Most of the circuitry of the MOS image sensors 101–104 is formed in accordance with copending U.S. application Ser. No. 09/110,879, which is hereby incorporated by reference. Each of the CMOS image sensors 101–104 outputs a video signal OUT 1, OUT 2, OUT 3, or OUT 4, respectively. The output video signals OUT 1–OUT 4 are combined and fed through a common signal line to an encoder 115. As will be described in more detail below, in some embodiments the encoder 115 may not be required. The output of the encoder 115 is received by a monitor 150, which is illustrated with four quadrants, QUAD 1, QUAD 2, QUAD 3, and QUAD 4. As will be described in more detail below, the video signal that is output from each of the four CMOS image sensors 101–104 may be displayed on either ¼, 1/2, or all of the screen area of the monitor 150.

In order for the analog video signals from the four CMOS image sensors 101–104 to be combined, the CMOS image sensors must be synchronized. In accordance with the present invention, the synchronization is provided by using the CMOS image sensor 101 as a master device, with the remaining three image sensors 102–104 following the synchronization signal through use of phase-locked loops (PLLs). Each of the CMOS image sensors 101–104 includes phase-locked loop circuitry PLL1, PLL2, PLL3, or PLL4, respectively. The synchronization signal SYNC that is output from the first CMOS image sensor 101 is received by the phase-locked loop circuitry PLL2–PLL4 of CMOS image sensors 102–104, respectively. The encoder 115 also receives the synchronization signal SYNC. This configuration allows the analog video signals that are output from the CMOS image sensors 101–104 to be synchronized, such that the signals can be combined and provided to the monitor 150, without requiring the signals to be converted to digital values for processing. This is a significant improvement over the prior art, which required the video signals to be converted to digital values for processing, and then converted back to analog signals for display on a television.

One basic type of phase-locked loop circuitry is described in the *Industrial Electronics Handbook*, IEEE Press, 1997, pp. 529–34. As described in that reference, phase-locked loop circuits such as PLL2–PLL4 keep an output signal synchronized in frequency and phase by using a reference input signal. More precisely, phase-locked loop systems are servo systems, which control the phase of their output signals in such a way that the phase error between the output phase and the reference phase is reduced to a minimum. In the present invention, the reference signal is provided by the first CMOS image sensor 101, and the remaining CMOS image sensors 102–104 are synchronized thereto by their phase-locked loop circuits PLL2–PLL4, respectively.

Each of the CMOS image sensors 101–104 also receives a control signal S1, S2, S3, or S4 from a master control circuit 110. The master control circuit 110 controls how the video output from each of the CMOS image sensors 101–104 will be displayed on the monitor 150. Each of the control signals S1, S2, S3, and S4 are received at state selection circuitry SEL1, SEL2, SEL3, or SEL4, within the CMOS image sensors 101–104. The state selection circuits SEL1–SEL4 cause each of the CMOS image sensors 101–104 to produce a video output in one of three states. In a first state, the video output from a CMOS image sensor is displayed in only one of the four quadrants, QUAD 1 to QUAD 4 of the monitor 150. In a second state, the video output from a CMOS image sensor is displayed in two quadrants. In a third state, the video output is displayed in all four quadrants of the monitor 150. Thus, if all four image sensors 101–104 are in the first state, the monitor 150 will simultaneously display the video signals from each of the image sensors 101–104. If one of the image sensors is in the second state, where its video signal is being displayed in two of the quadrants, the remaining two quadrants will either be occupied by video signals from two of the other image sensors in the first state, or else one of the other image sensors in the second state. An image sensor in the third state occupies the entire screen of the monitor 150.

The CMOS image sensors 101–104 can output video signals in YUV, RGB, or $C_{VO}$ (composite video format) format. If the image sensors 101–104 output video signals in the YUV or RGB format, then the encoder 115 is required for the signal processing. However, in a system where the output video signals are in the $C_{VO}$ format, then the encoder 115 is not required. As stated above, the encoder 115 is synchronized according to the synchronization signal SYNC from the first CMOS image sensor 101. The encoder 115 is a relatively inexpensive component that can be purchased off the shelf.

Figure 3:
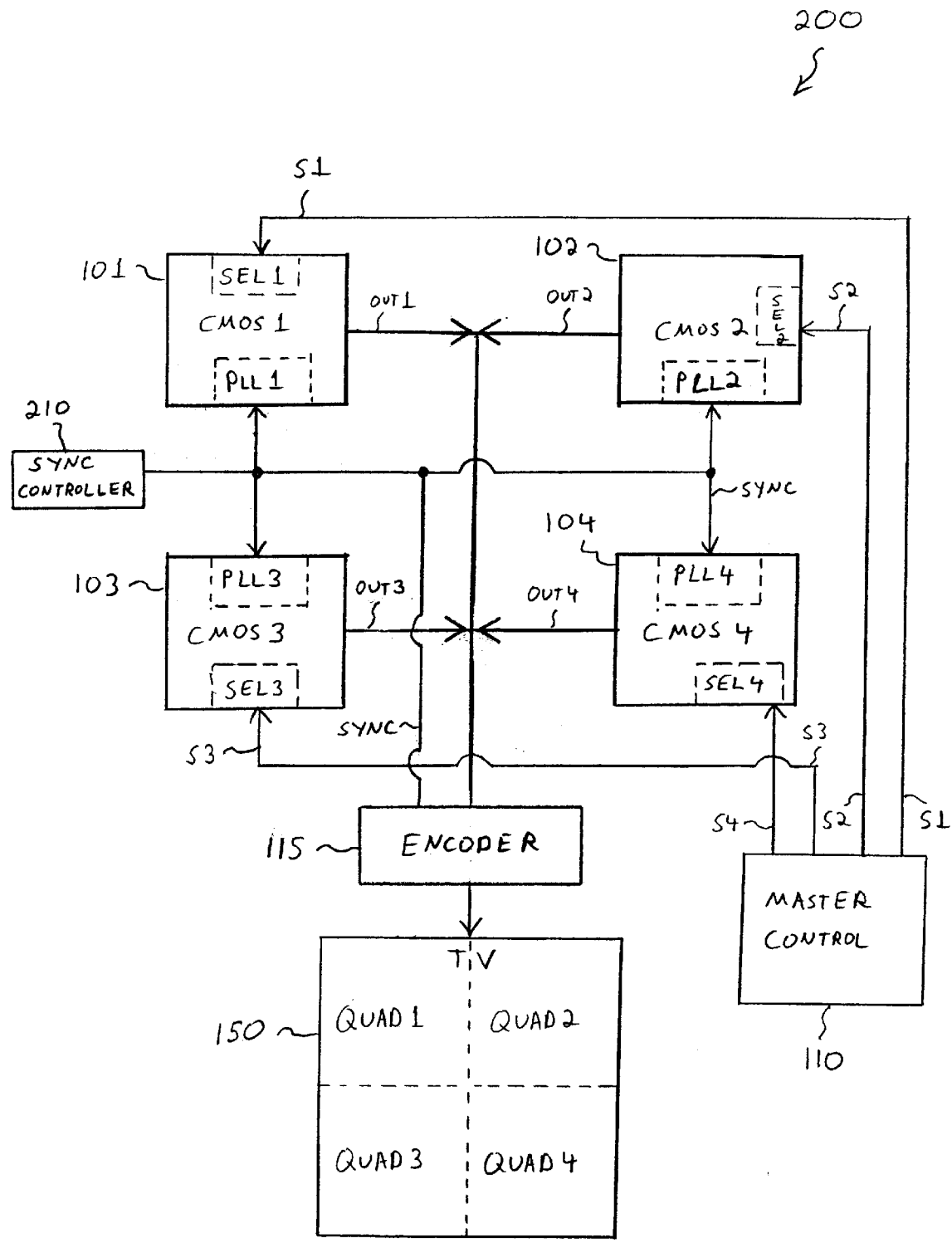
FIG. 3 is an alternate embodiment of a monitoring system utilizing CMOS image sensors formed in accordance with the present invention.

FIG. 3 illustrates an alternate embodiment of the present invention. The monitoring system 200 of FIG. 3 is similar to the monitoring system 100 of FIG. 2, with the addition of a SYNC controller 210. The SYNC controller 210 provides the synchronization signal SYNC that controls the synchronization of the CMOS image sensors 101–104. Thus, unlike the monitoring system 100 of FIG. 2, wherein the synchronization signal was provided by the first CMOS image sensor 101, in the monitoring system 200 of FIG. 3, synchronization controller 210 controls the synchronization of the CMOS image sensors 101–104.

While the preferred embodiment of the invention has been illustrated and described, it will be appreciated that various changes can be made therein without departing from the spirit and the scope of the invention. The present invention has been described in relation to a preferred embodiment and several variations thereof. One of ordinary skill after reading the foregoing specification will be able to effect various changes, alterations, and substitutions of equivalents without departing from the broad concepts disclosed. It is therefore intended that the scope of the letters patent granted hereon be limited only by the definition contained in the appended claims and the equivalents thereof, and not by limitations of the embodiments described thereof.

The embodiments of the invention in which an exclusive property or privilege is claimed are defined as follows:

1. A method for providing a multiple-camera monitoring system utilizing a plurality of CMOS image sensors, the method comprising:
   (a) providing an analog video output from each of the CMOS image sensors;
   (b) synchronizing the analog video outputs by providing a reference signal to phase-locked loop circuitry in at least one of the CMOS image sensors;
   (c) combining the analog video outputs to be displayed on a display such that the video outputs from at least two of the image sensors may be displayed on the display at the same time; and
   (d) maintaining the analog video outputs from the CMOS image sensors in analog format along the entire signal path from the CMOS image sensors to the display.

2. The image sensor of claim 1 wherein the reference signal that is provided to the phase-locked loop circuitry is produced by one of the CMOS image sensors.

3. The method of claim 1, wherein all of the CMOS image sensors contain phase-locked loop circuitry, and the reference signal provided thereto is produced by a synchronization controller.

4. The method of claim 1, wherein the plurality of CMOS image sensors include at least four CMOS image sensors, each of which may be simultaneously displayed on a selected ¼ portion of the display.

5. The method of claim 1, further comprising coordinating the analog video outputs of each of the plurality of CMOS image sensors to determine which analog video outputs will be displayed on which proportions of the display.

6. The method of claim 5, wherein each of the analog video outputs may be displayed on ¼, ½, or all of the display.

7. A method for providing a multiple-camera monitoring system utilizing a plurality of CMOS image sensors, the method comprising:

(a) providing an analog video output from each of the CMOS image sensors;

(b) synchronizing the analog video outputs by providing a reference signal to phase-locked loop circuitry in at least one of the CMOS image sensors, said reference signal being generated by one of said CMOS image sensors;

(c) combining the analog video outputs to be displayed on a display such that the video outputs from at least two of the image sensors may be displayed on the display at the same time; and (d) maintaining the analog video outputs from the CMOS image sensors in analog format along the entire signal path from the CMOS image sensors to the display.

* * * * *